US009853523B2

United States Patent
Caron et al.

(10) Patent No.: US 9,853,523 B2
(45) Date of Patent: Dec. 26, 2017

(54) WHEEL MOTOR COOLING SYSTEM WITH EQUALLY DIVIDED FLOW

(71) Applicant: FAIRFIELD MANUFACTURING COMPANY, INC., Lafayette, IN (US)

(72) Inventors: LaVerne Andrew Caron, Kalamazoo, MI (US); Shuo Zhang, Lafayette, IN (US); Keith Mears, Delphi, IN (US)

(73) Assignee: FAIRFIELD MANUFACTURING COMPANY, INC., Lafayette, IN (US)

( * ) Notice: Subject to any disclaimer, the term of this patent is extended or adjusted under 35 U.S.C. 154(b) by 365 days.

(21) Appl. No.: 14/839,951

(22) Filed: Aug. 29, 2015

(65) Prior Publication Data
US 2017/0063202 A1    Mar. 2, 2017

(51) Int. Cl.
*B60K 11/00*    (2006.01)
*H02K 9/193*    (2006.01)
(Continued)

(52) U.S. Cl.
CPC .......... *H02K 9/193* (2013.01); *B60K 7/0007* (2013.01); *H02K 7/102* (2013.01); *H02K 7/116* (2013.01);
(Continued)

(58) Field of Classification Search
CPC .......... H02K 9/19; H02K 9/193; H02K 7/102; H02K 7/116; H02K 16/00; B60K 1/00; B60K 6/365; B60K 6/445; B60K 11/08; B60K 7/00; B60K 7/0007; B60K 7/0015; B60K 17/046; B62K 11/10; B60L 1/003;
(Continued)

(56) References Cited

U.S. PATENT DOCUMENTS 3,618,710 A    11/1971    Delisse
4,418,777 A    12/1983    Stockton
(Continued)

FOREIGN PATENT DOCUMENTS

DE    102012112377    6/2014
WO    2013110677    8/2013
WO    2014102949    7/2014

OTHER PUBLICATIONS

Dry Sump, Wikipedia, May 24, 2015, pp. 1-3.
(Continued)

*Primary Examiner* — Tran Nguyen
(74) *Attorney, Agent, or Firm* — Woodling, Krost and Rust

(57) ABSTRACT

An electric wheel motor cooling system includes first and second electric wheel motors and gear reducers which use hydraulic fluid for cooling and lubrication. Each of the electric wheel motor housings includes a sump and a scavenge pump for return of hydraulic fluid to the hydraulic fluid reservoir. A remotely located hydraulic pump interconnected with the hydraulic fluid reservoir supplies and powers first and second locally located hydraulic motors which supply the electric motors and gears with an equal flow of lubricating and cooling oil. The first and second hydraulic motors, in turn, drive a common output shaft which, in turn, drives first and second scavenge pumps. The first and second scavenge pumps have a higher fluid flow rate than the hydraulic motors ensuring that oil is removed from the first and second electric wheel motor housings thus eliminating any churning losses of the motors or gears.

18 Claims, 5 Drawing Sheets

(51) Int. Cl.
*H02K 7/116* (2006.01)
*H02K 7/102* (2006.01)
*B60K 7/00* (2006.01)
*B60K 11/02* (2006.01)
*B60K 17/04* (2006.01)
*B60K 1/00* (2006.01)

(52) U.S. Cl.
CPC .............. *B60K 11/02* (2013.01); *B60K 17/043* (2013.01); *B60K 2001/006* (2013.01); *B60K 2007/0038* (2013.01); *B60K 2007/0092* (2013.01); *B60Y 2200/142* (2013.01); *B60Y 2200/20* (2013.01); *B60Y 2200/41* (2013.01); *B60Y 2306/03* (2013.01)

(58) Field of Classification Search
CPC ........ B60L 1/02; B60L 3/0023; B60L 3/0061; B60L 11/123; B60L 11/14; B60L 11/18; B64D 35/00; F16D 31/02; F16H 1/32; F16H 57/04; F16H 57/043; F16H 57/0436; F16H 57/047; F16H 57/0476; F16N 39/00; F16N 39/002; F16N 7/00; F16N 7/40; F01M 11/00; F01M 11/06
See application file for complete search history.

(56) References Cited

U.S. PATENT DOCUMENTS

| | | | |
|---|---|---|---|
| 4,681,189 A | 7/1987 | Krisiloff | |
| 4,724,806 A | 2/1988 | Hartwig | |
| 4,909,354 A | 3/1990 | Fluegel | |
| 4,953,663 A * | 9/1990 | Sugden | F16N 7/40 184/6.12 |
| 4,962,829 A * | 10/1990 | Sugden | F01M 11/06 184/27.2 |
| 5,001,901 A * | 3/1991 | Erickson | B64D 35/00 60/336 |
| 5,111,090 A | 5/1992 | Otake et al. | |
| 5,279,391 A | 1/1994 | Ward | |
| 5,505,112 A | 4/1996 | Gee | |
| 5,931,218 A * | 8/1999 | Carlson | F28D 7/005 165/47 |
| 6,199,652 B1 | 3/2001 | Mastroianni et al. | |
| 6,227,221 B1 | 5/2001 | Schmitz | |
| 6,461,207 B1 | 10/2002 | Nanami | |
| 6,537,115 B2 | 3/2003 | Suganuma et al. | |
| 7,137,376 B2 | 11/2006 | Ito | |
| 7,178,498 B2 | 2/2007 | Takeuchi | |
| 7,261,172 B2 * | 8/2007 | Tsukada | B60K 1/00 180/229 |
| 7,789,200 B2 | 9/2010 | Munson | |
| 7,963,186 B2 | 6/2011 | Hayes et al. | |
| 8,080,909 B2 | 12/2011 | Perkins | |
| 8,152,674 B2 | 4/2012 | Hayes et al. | |
| 8,448,623 B2 | 5/2013 | Kataoka | |
| 8,450,888 B2 | 5/2013 | Shafer et al. | |
| 8,776,950 B2 | 7/2014 | Quehenberger et al. | |
| 8,803,383 B2 | 8/2014 | Miyachi et al. | |
| 8,920,143 B2 | 12/2014 | Stolpe et al. | |
| 8,961,348 B2 | 2/2015 | Weber et al. | |
| 8,973,363 B2 | 3/2015 | Rohwer et al. | |
| 9,022,174 B2 * | 5/2015 | Takagi | B60K 6/445 184/6.12 |
| 9,033,107 B2 | 5/2015 | Schneider et al. | |
| 2007/0015619 A1 * | 1/2007 | Sasahara | B60K 7/0007 475/178 |
| 2008/0121464 A1 | 5/2008 | Ledger et al. | |
| 2010/0187043 A1 | 7/2010 | Murahashi et al. | |
| 2010/0295391 A1 | 11/2010 | Perkins | |
| 2012/0217793 A1 | 8/2012 | Drum et al. | |
| 2012/0230843 A1 | 9/2012 | Ravipati et al. | |

OTHER PUBLICATIONS

European Patent Office, European Search Report, dated Feb. 2, 2017, pp. 1-10, Application No. 16167795.0-1762, Applicant: Fairfield Manufacturing Company, Inc.

* cited by examiner

WHEEL MOTOR COOLING SYSTEM WITH EQUALLY DIVIDED FLOW

FIELD OF THE INVENTION

The invention is in the field of wheel motors and gearboxes which drive an electric vehicle.

BACKGROUND OF THE INVENTION

Electric wheel drive systems used in off-highway machinery require a flow of coolant such as hydraulic oil to maintain an optimum operating temperature. Oil cooling is advantageous because it can provide both cooling and lubrication. Since churning losses can reduce efficiency, especially at higher speeds, dry sump systems are a preferred approach for implementing these cooling and lubrication systems.

Implementation of a dry sump system in a simple form requires providing a supply and a scavenge pump at each wheel motor site and providing a means for powering these pumps. To simplify the systems, the required pumps can be ganged together so that a single power source can be used, but providing this power source and controlling it adds complexity and is undesirable.

SUMMARY OF THE INVENTION

The purpose of this invention is to facilitate construction of an electric wheel drive system that can be installed on a vehicle with minimal interface and connectivity requirements. The key aspect of this invention is that the power source for the dry sump system is provided by the cooling and lubricating fluid which is supplied from a remotely mounted reservoir and pump. With this arrangement the dry sump components can be mounted near the electric drives (for example packaged within a common axle housing) and the entire assembly can be cooled and lubricated via a single supply and return line.

The system described in this invention performs two functions. It divides the supply fluid for distribution to the wheel drive sites and it provides a means to use the energy in the fluid supply to drive one or more scavenge pumps as needed to assure that fluid levels in the sumps are kept away from rotating components.

A flow divider provides parallel flow to a set of constant displacement motors that have their drive shafts connected together. The output flow from the motors will be split in direct ratio to the motor displacements (e.g. for two equal displacement pumps the flow will be evenly split). In addition to splitting the flow, these motors can now be used to drive one or more scavenge pumps that form the remainder of the system.

In one example, tandem positive displacement motors are used to power two scavenge pumps in housings that form an axle. The tandem positive displacement motors divide the flow equally to each wheel motor and provides power to the scavenge pumps. The two positive displacement motors are combined with the two scavenge pumps into a single four-section unit. The four section unit shares a common shaft and has common motor inlets and pump outlets to minimize the number of fluid connections.

Hydraulic motors and pumps intended for high pressure use (e.g. 2000 to 5000 PSI) are built with tight fitting, tight tolerance parts. In particular, the side clearances on the gears have tight tolerances. The tight tolerances are needed to maintain low leakage across the hydraulic units at the high pressures being used. However their tight fits also result in high frictional losses.

At very high pressures, the frictional losses are acceptable relative to the power levels (pressure×flow rate). At the lower pressure levels (several hundred psi) being used for cooling and lubrication herein, the losses resulting from these tight fits is very high relative to the useful work being done. Therefore hydraulic units with looser fits (more side clearance on the gears, etc.) and lower frictional losses would be more appropriate for these lower pressure applications.

Losses in the cooling and lubrication system are not an insignificant issue. These losses may be on the order of 1 kW each for the axles and the generator in a typical off-highway machine. This is large relative to the overall drive train power levels that are on the order of 200 kW. This is of particular concern for a system that has a primary purpose of improving efficiency.

An important aspect of the invention is that the supply pump is not part of the common shaft system. Instead, the supply pump (which also provides the power for the system, namely, the hydraulic motors and the scavenge pumps) is remotely located from the axle assembly; for example, the supply pump is a part of the engine-driven accessories.

There are a wide variety of hydraulic pumps and motors that can be used in the invention.

It is an object of the invention to provide a simple and flexible method for managing the cooling and lubricating system for vehicles incorporating one or more electric drive axles.

It is an object of the invention to provide an electric wheel motor cooling system which minimizes the usage of space near the wheel motors.

It is an object of the invention to provide an electric wheel motor cooling system which is also used for cooling a gear reducer located in proximity to the electric wheel motors.

It is an object of the invention to provide an electric wheel motor cooling system which employs a remotely located pump which drives locally mounted constant displacement hydraulic motors which divide the flow of hydraulic fluid equally between the electric wheel motors and gear reducers.

It is an object of the invention to provide an electric wheel motor cooling system which employs a remotely located pump which drives locally mounted constant displacement hydraulic motors which drive one or more locally mounted scavenge pumps.

It is an object of the invention to provide an electric wheel motor cooling system which employs one or more locally mounted scavenge pumps which remove cooling and lubrication oil from the electric wheel housings and returns it to the hydraulic oil reservoir.

It is an object of the invention to provide an electric wheel motor cooling system which employs a remotely located pump which drives locally mounted constant displacement hydraulic motors which drive one or more locally mounted scavenge pumps, and, the scavenge pumps have a pumping flow capacity greater than the constant displacement hydraulic motors ensuring that the scavenge sumps are evacuated and that hydraulic fluid is removed and does not impede the rotation of the electric motors and/or the gear reducer.

It is an object of the invention to provide an electric wheel motor cooling system wherein locally mounted constant displacement hydraulic motors are coupled together such that they rotate together.

It is an object of the invention to provide an electric wheel motor cooling system which employs a remotely located pump which drives locally mounted constant displacement hydraulic motors which are coupled and rotate together which, in turn, are coupled to one or more scavenge pumps.

BRIEF DESCRIPTION OF THE DRAWINGS

FIG. 4 further illustrates: a first coupling interconnecting first and second hydraulic motors associated with the first axle with first and second scavenge pumps; and, a second coupling interconnecting third and fourth hydraulic motors associated with the second axle with third and fourth scavenge pumps.

DESCRIPTION OF THE INVENTION

Figure 1:
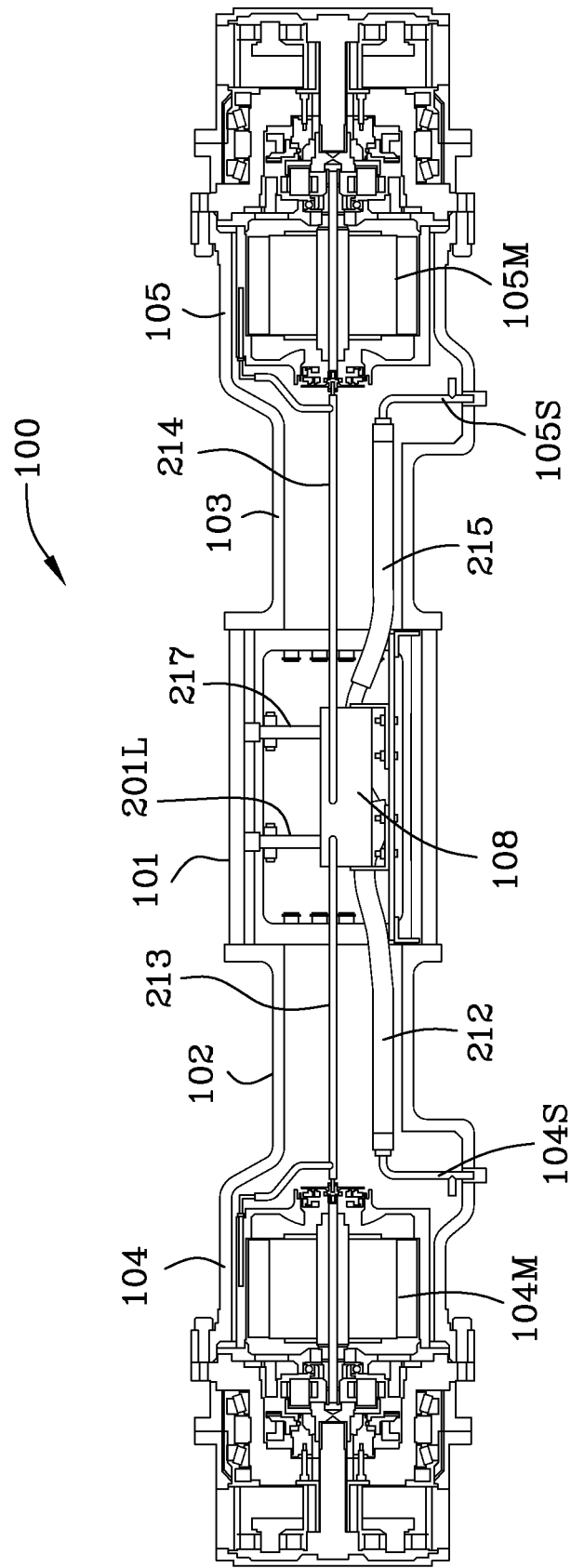
FIG. 1 is a schematic cross section of an axle illustrating the first and second scavenge sumps located in the first and second wheel motor housings and the first and second scavenge pumps removing hydraulic fluid therefrom.

FIG. 1 is a schematic cross section 100 of an axle illustrating the scavenge sumps and the scavenge pumps for removal of the lubricating and cooling oil from the first wheel motor housing 104 and the second wheel motor housing 105. FIG. 1 illustrates centrally located housing 101 in an axle between the first wheel motor 104M and the second wheel motor 105M. Intermediate housing 102 resides between the centrally located housing 101 and the first wheel housing 104. Intermediate housing 103 resides between the centrally located housing 101 and the second wheel housing 105. First wheel housing 104 includes the first wheel motor 104M and the first wheel housing scavenge sump 104S. Second wheel housing 105 includes second wheel motor 105M and the second wheel housing scavenge sump 105S. Conduit 212 for conveying fluid from the sump 104S to the housing 108 for scavenge pumps 204, 205. Conduit 215 for conveying fluid from the sump 105S to the housing 108 for scavenge pumps 204, 205.

FIG. 1 also illustrates a gear reducer for reducing the speed of the driven wheel and increasing the torque to the driven wheel. The gears of the gear reducer, the bearings of the gear reducer, the bearings of the electric motor, and the electric motor all require lubrication and cooling oil.

Figure 2:
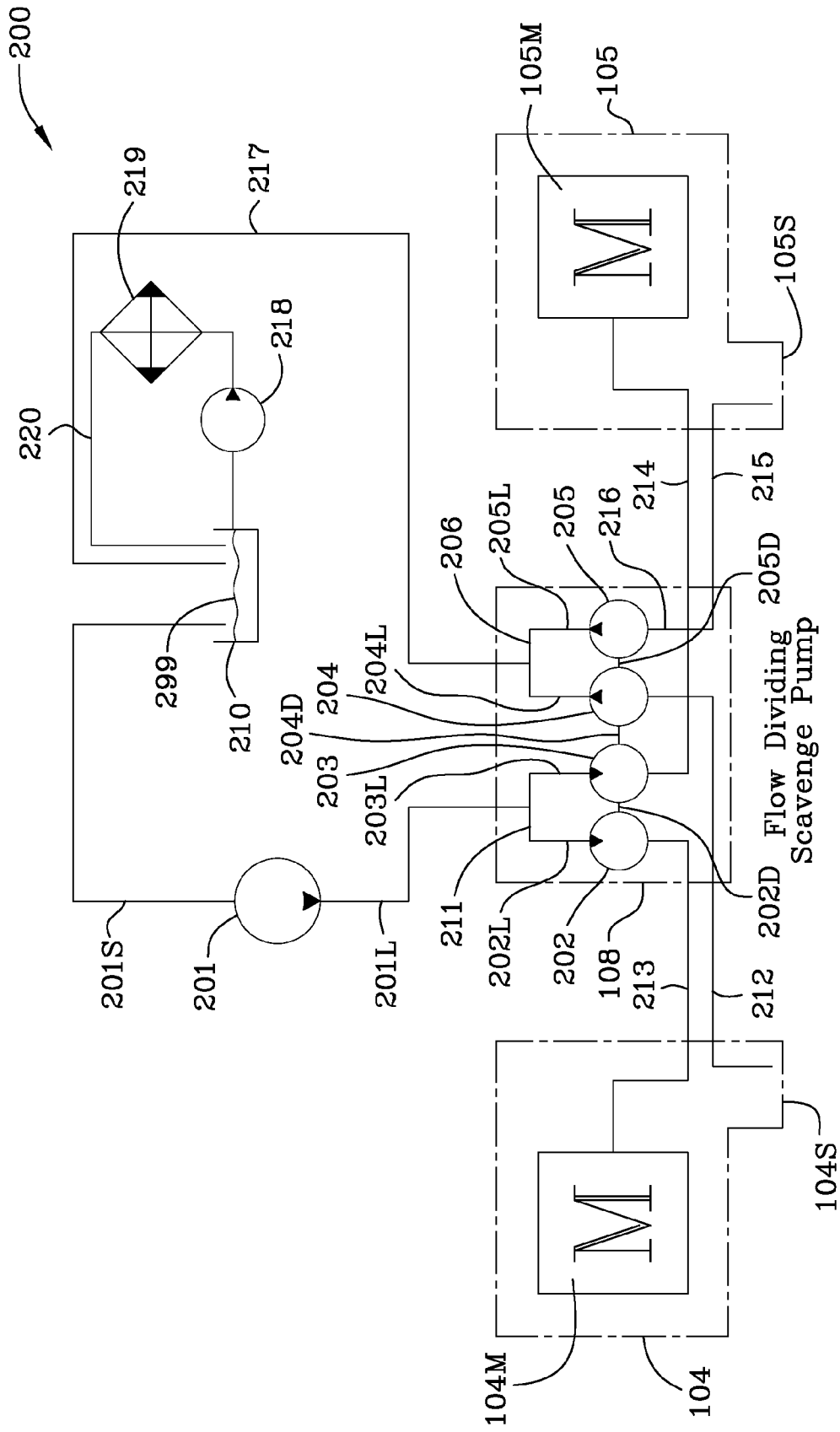
FIG. 2 is a cooling system schematic for a single axle with lubrication and cooling fluid supplied from a reservoir by a first supply pump, and the lubrication and cooling fluid is subsequently divided between first and second wheel motors by a first constant displacement hydraulic motor and a second constant displacement hydraulic motor, a first scavenge pump (powered by the first constant displacement hydraulic motor and the second constant displacement hydraulic motor) associated with a first sump of the first wheel motor returns fluid to the reservoir, and a second scavenge pump (powered by the first constant displacement hydraulic motor and the second constant displacement hydraulic motor) associated with a second sump of the second wheel motor returns fluid to the reservoir.

FIG. 2 is a cooling system schematic 200 for a single axle with lubrication and cooling fluid 299 supplied from a reservoir 210 by a first supply pump 201, and the lubrication and cooling fluid 299 is subsequently divided between first wheel motor 104M and second wheel motor 105M by a first constant displacement hydraulic motor 202 and a second constant displacement hydraulic motor 203, a first scavenge pump 204 (powered by the first constant displacement hydraulic motor 202 and the second constant displacement hydraulic motor 203) associated with a first sump 104S of the first wheel motor 104M returns fluid to the reservoir 210, and a second scavenge pump 205 (powered by the first constant displacement hydraulic motor 202 and the second constant displacement hydraulic motor 203) associated with a second sump 105S of the second wheel motor 105M returns fluid to the reservoir 210. The first supply pump 201 can be located near the vehicle engine (not shown) thus saving space near the wheel motors 104M, 105M.

Referring to FIG. 2, one of the important aspects of the invention is that a pair of constant displacement hydraulic motors 202, 203 coupled together by a common shaft 202D is used as a flow divider to supply electric motors 104M, 105M on both sides of an axle while simultaneously providing a drive means for a pair of scavenge pumps 204, 205. An important aspect of the invention is that the supply pump 201 is not part of the common shaft system. Instead, the supply pump 201 (which also provides the power) is remotely located from the axle assembly; for example, the supply pump is a part of the engine-driven accessories.

Feed line 213 communicates hydraulic fluid from first constant displacement hydraulic motor 202 to first wheel motor 104M. Feed line 214 communicates hydraulic fluid from first constant displacement hydraulic motor 203 to first wheel motor 105M.

Still referring to FIG. 2, the supply pump suction line 201S feeds oil 299 from oil (hydraulic fluid) reservoir 210 to the pump 201. Interconnecting line 201L communicates oil flow between supply pump 201 and header 211. Header 211 supplies branch line 202L interconnecting header 211 and constant displacement hydraulic motor 202 and header 211 also supplies branch line 203L interconnecting header 211 and constant displacement hydraulic motor 203. Hydraulic motors 202, 203 receive equal flow from their respective branch lines 202L, 203L at equal pressure dividing the flow from pump 201 to supply the lubrication needs of motors 104M, 105M. Hydraulic motors 104M, 105M are not immersed in lubricating oil thus there are no churning losses due to oil in the motor housings 104, 105. Similarly, the associated gear reducers are not immersed in oil.

Drive link 202D between the first constant displacement hydraulic motor 202 and the second constant displacement hydraulic motor 203 couples the constant displacement hydraulic motor together. Drive link 204D between constant displacement hydraulic motor 203 and scavenge pump 204 is illustrated in FIG. 2. Drive link 204D drives scavenge pumps 204, 205. Arrows on the motors 202, 203 indicate the direction of flow therein. Arrows on the pumps 204, 205 indicate the direction of flow therein.

Feed line 212 conveys hydraulic fluid (oil) from the first constant displacement hydraulic motor 202 to the first wheel motor 104M. Feed line 214 conveys hydraulic fluid (oil) from the second constant displacement hydraulic motor 203 to the second wheel motor 105M.

Drive link 205D couples the first scavenge pump 204 and the second scavenge pump 205 together. First and second scavenge pumps 204, 205 are driven by link 204D powered by motors 202, 203. Hydraulic motors 202, 203 and scavenge pumps 204, 205 include unnumbered arrows which indicate the direction of the hydraulic oil flow. The unnumbered arrows are used in FIGS. 2-5.

Still referring to FIG. 2, suction line 212 conveys hydraulic oil (fluid) from first wheel housing scavenge sump 104S to scavenge pump 204 and suction line 215 conveys hydraulic oil (fluid) from second wheel housing scavenge sump 105S to scavenge pump 205. Discharge header 206 is fed from scavenge pump 204 discharge line 204L and from scavenge pump 205 discharge line 205L. Return line 217 conveys hydraulic fluid from the discharge header 206 to the reservoir 210. Hydraulic pump 218 is fed from reservoir 210 and pumps hydraulic oil into and through hydraulic cooler 219 and through return line 220.

Figure 3:
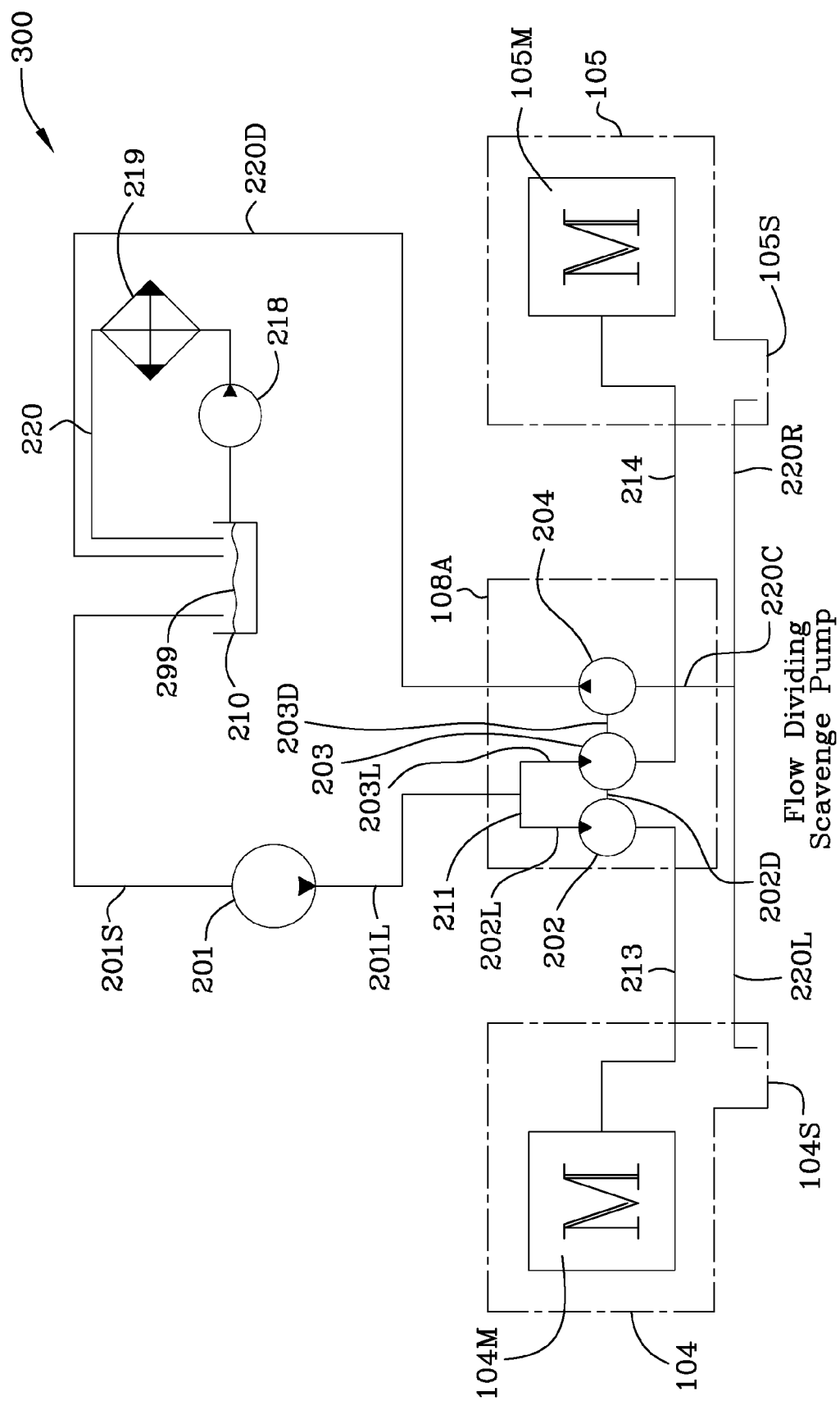
FIG. 3 is a cooling system schematic for a single axle with lubrication and cooling fluid supplied from a reservoir by a first supply pump, and the lubrication and cooling fluid is subsequently divided between first and second wheel motors by a first constant displacement hydraulic motor and a second constant displacement hydraulic motor, and a common scavenge pump powered by the first and second hydraulic motors, the common scavenge pump fed from the sumps of the first and second wheel motors and returning fluid to the reservoir.

FIG. 3 is a cooling system schematic 300 for a single axle with lubrication and cooling fluid 299 supplied from a reservoir 210 by a first supply pump 201, and the lubrication and cooling fluid 299 is subsequently divided between first and second wheel motors 104M, 105M by a first constant displacement hydraulic motor 202 and a second 203 constant displacement hydraulic motor, common scavenge pump 204 powered by the first and second hydraulic motors 202, 203, the common scavenge pump 204 fed from the sumps 104S, 105S of the first 104M and second 105M wheel motors and returning fluid 299 to the reservoir 210.

Still referring to FIG. 3, housing 108A illustrates flow dividing constant displacement hydraulic motors 202, 203 and common scavenge pump 204. A common suction line 220C feeds scavenge pump 204. Common suction line 220C is fed by suction lines 220L, 220R from sumps 104S, 105S. Discharge line 220D of scavenge pump 204 leads to oil reservoir 210. Suction line 220L from first wheel housing scavenge sump 104S supplies oil to scavenge pump common line 220C and suction line 220R from second wheel housing scavenge sump 105S supplies oil to scavenge pump common line 220C in FIG. 3.

Figure 4:
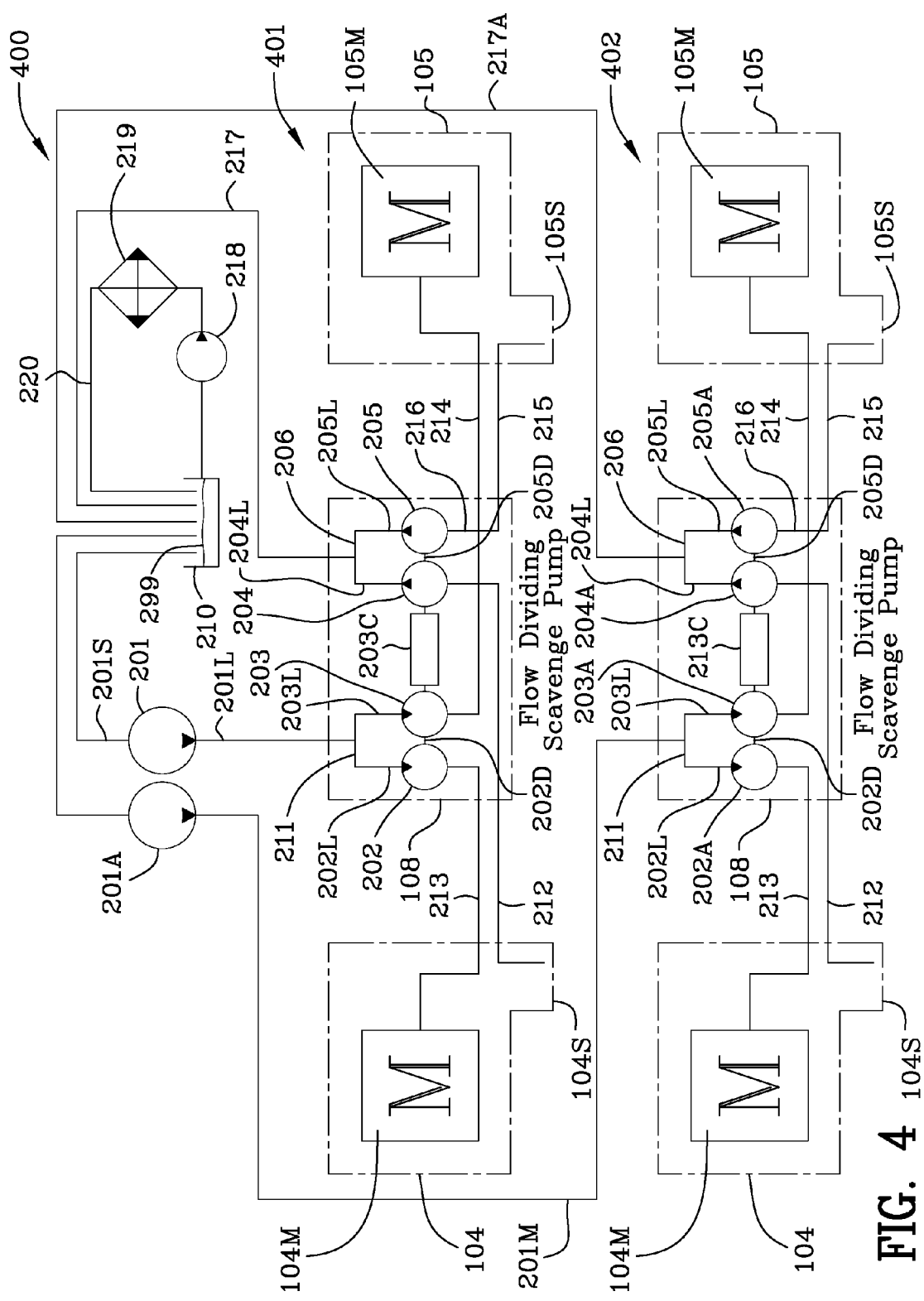
FIG. 4 is a cooling system schematic similar to FIG. 2 illustrating, among other things, first and second axles with: lubrication and cooling fluid supplied to the first axle from a reservoir by a first supply pump, and, lubrication and cooling fluid supplied to the second axle from a reservoir by a second supply pump.

FIG. 4 is a cooling system schematic 400 similar to FIG. 2 illustrating, among other things, first 401 and second 402 axles with: lubrication and cooling fluid 299 supplied to the first axle 401 from the reservoir 210 by a first supply pump 201, and, lubrication and cooling fluid 299 supplied to the second axle 402 from the reservoir 210 by a second supply pump 201A. Second supply pump 201A is preferably located near the vehicle engine in the example of FIGS. 4 and 5. Interconnecting line 201M conveys fluid between supply pump 201A and header 211. First supply pump 201 is preferably located near the vehicle engine (which can be an internal combustion engine) in the examples of FIGS. 1-5.

FIG. 4 further illustrates a first coupling 203C associated with a first axle 401. Specifically, FIG. 4 further illustrates a first coupling 203C interconnecting first and second scavenge pumps 204, 205 with motors 202, 203. A second coupling 213C interconnects third and fourth hydraulic motors 202A, 203A associated with the second axle 402 with third and fourth scavenge pumps 204A, 205A. See FIG. 4. Axles 401, 402 illustrated in FIG. 4 are each operated as described hereinabove in regard to FIG. 2. Couplings 203C, 213C are the functional equivalent of the link 204D illustrated in FIG. 2.

The structure and function of the axles 401, 402 are identical. Different reference numerals are used for the motors 202A, 203A and the scavenge pumps 204A, 205A to differentiate between axles 401, 402. Reference numeral 217A is used for the return line from axles 402 in FIG. 4 and FIG. 5.

Figure 5:
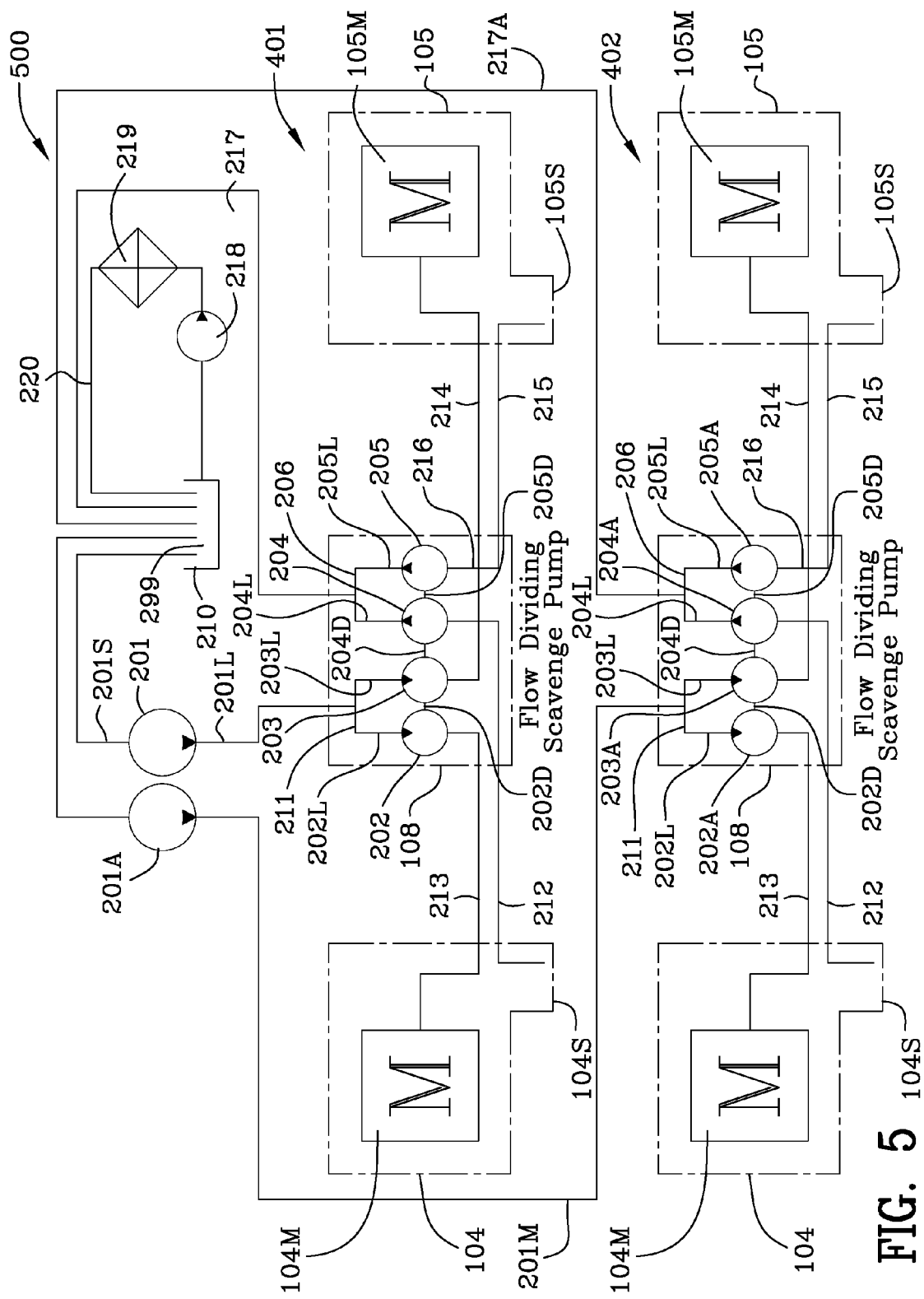
FIG. 5 is a cooling system schematic similar to FIGS. 1 and 4 illustrating, among other things, first and second axles with: lubrication and cooling fluid supplied to the first axle from a reservoir by a first supply pump, and, lubrication and cooling fluid supplied to the second axle from a reservoir by a second supply pump.

FIG. 5 is a cooling system schematic 500 similar to FIGS. 1 and 4 illustrating, among other things, first 401 and second 402 axles with: lubrication and cooling fluid 299 (hydraulic oil) supplied to the first axle 401 from the reservoir 210 by a first supply pump 201, and, lubrication and cooling fluid 299 supplied to the second axle 402 from a reservoir by a second supply pump 201A. FIG. 5 is substantially similar to FIG. 4 with the exception that links 403, 404 other than couplings 203C, 213C are used to drive the scavenge pumps 204, 205.

Those of skill in the art will recognize that the invention has set forth by way of examples only and that changes may be made to the invention as set forth herein without departing from the spirit and scope of the invention as set forth in the claims.

REFERENCE NUMERALS

100 diagrammatic cross section of an axle illustrating a pumping network for the distribution of lubricating oil between first and second wheel motors.
101 centrally located housing in an axle between the first wheel motor and the second wheel motor
102 intermediate housing between the centrally located housing 101 and the first wheel housing 104
103 intermediate housing between the centrally located housing 101 and the second wheel housing 104
104 first wheel housing
104M first wheel motor
104S first wheel housing scavenge sump
105 second wheel housing
105M second wheel motor
105S second wheel housing scavenge sump
108 housing for flow dividing constant displacement hydraulic motors 202, 203 and for scavenge pumps 204, 205
108A housing for flow dividing constant displacement hydraulic motors 202, 203 and for common scavenge pump 204
200 cooling system schematic for a single axle with lubrication and cooling fluid supplied from a reservoir by a first supply pump, and the lubrication and cooling fluid is subsequently divided between first and second wheel motors by a first constant displacement hydraulic motor and a second constant displacement hydraulic motor, a first scavenge pump (powered by the first constant displacement hydraulic motor and the second constant displacement hydraulic motor) associated with a first sump of the first wheel motor returns fluid to the reservoir, and a second scavenge pump (powered by the first constant displacement hydraulic motor and the second hydraulic motor) associated with a second sump of the second wheel motor returns fluid to the reservoir.
201 first supply pump which can be located near the vehicle engine
201A second supply pump which can be located near the vehicle engine in FIGS. 4 and 5

201L interconnecting line between supply-pump 201 and header 211

201M interconnecting line between supply-pump 201A and header 211

201S supply pump suction line from oil (hydraulic fluid) reservoir 210

202 first constant displacement hydraulic motor 202A third constant displacement hydraulic motor 202D drive link between the first constant displacement hydraulic motor 202 and the second constant displacement hydraulic motor 203

202L branch line interconnecting header 211 and constant displacement hydraulic motor 202

203 second constant displacement hydraulic motor 203A fourth constant displacement hydraulic motor 203C coupling between the constant displacement hydraulic motors 202, 203 and the scavenge pumps 204, 205 in FIG. 4

203D drive link between constant displacement hydraulic motor 203 and scavenge pump 204 in FIG. 2

203L branch line interconnecting header 211 and constant displacement hydraulic motor 203

204 first scavenge pump 204A third scavenge pump 204D drive link between constant displacement hydraulic motors 202, 203 and scavenge pumps 204, 205

204E drive link between constant displacement hydraulic motors 202, 204 and scavenge pumps 204, 205

204F drive link between constant displacement hydraulic motors 202A, 203A and scavenge pumps 204A, 205A

205 second scavenge pump 205A fourth scavenge pump 205D drive link between the first scavenge pump 204 and the second scavenge pump 205

206 discharge header fed from scavenge pump 204 discharge line 204L and from scavenge pump 205 discharge line 205L

210 oil (hydraulic fluid) reservoir 211 header feeding line 202L and first constant displacement hydraulic motor 202 and feeding line 203L and second constant displacement hydraulic motor 203

212 suction line from first wheel housing scavenge sump 104S to scavenge pump 204

213 feed line from first constant displacement hydraulic motor 202 to first wheel motor 104M

214 feed line from first constant displacement hydraulic motor 203 to first wheel motor 105M

213C coupling between the constant displacement hydraulic motors 202A, 203A and the scavenge pumps 204A, 205A in FIG. 4

215 suction line from second wheel housing scavenge sump 105S to scavenge pump 205

217 return line from the discharge header 206 to the reservoir 210

217A return line in the example of FIGS. 4 and 5

218 hydraulic pump from fed from reservoir 210 and pumping into and through cooler 219

219 hydraulic cooler 220 return line from hydraulic cooler 219 to reservoir 210

220C common suction line for scavenge pump 204 fed by suction lines 220L, 220R from sumps 104S, 105S

220D discharge line of scavenge pump 204 in FIG. 3 leading to reservoir 210

220L suction line from first wheel housing scavenge sump 104S to scavenge pump common line 220C in FIG. 3

220R suction line from second wheel housing scavenge sump 105S to scavenge pump common line 220C in FIG. 3

299 hydraulic fluid in the reservoir 210

300 cooling system schematic for a single axle with lubrication and cooling fluid supplied from a reservoir by a first supply pump, and the lubrication and cooling fluid is subsequently divided between first and second wheel motors by a first constant displacement hydraulic motor and a second constant displacement hydraulic motor, and a common scavenge pump powered by the first and second hydraulic motors, the common scavenge pump fed from the sumps of the first and second wheel motors and returning fluid to the reservoir.

400 cooling system schematic similar to FIG. 2 illustrating, among other things, first and second axles with: lubrication and cooling fluid supplied to the first axle from a reservoir by a first supply pump, and, lubrication and cooling fluid supplied to the second axle from a reservoir by a second supply pump; FIG. 4 further illustrates: a first coupling interconnecting first and second hydraulic motors associated with the first axle with first and second scavenge pumps; and, a second coupling interconnecting third and fourth hydraulic motors associated with the second axle with third and fourth scavenge pumps.

401 first axle 402 second axle 500 cooling system schematic similar to FIGS. 1 and 4 illustrating, among other things, first and second axles with: lubrication and cooling fluid supplied to the first axle from a reservoir by a first supply pump, and, lubrication and cooling fluid supplied to the second axle from a reservoir by a second supply pump.

The invention claimed is:

1. An electric wheel motor cooling system, comprising:
a hydraulic fluid reservoir;
a first electric wheel motor housing and a second electric wheel motor housing:
a first electric wheel motor resides in said first electric wheel motor housing and a second electric wheel motor resides in said second electric wheel motor housing;
each of said electric wheel motor uses hydraulic fluid for cooling and lubrication;
a supply pump interconnected with said hydraulic fluid reservoir;
a first constant displacement hydraulic motor and a second constant displacement hydraulic motor;
said supply pump supplies and powers said first and said second constant displacement hydraulic motors with hydraulic fluid;
said first and said second constant displacement hydraulic motors rotate together and drive a common drive shaft;
said first electric wheel motor housing includes a first scavenge sump;
said second electric wheel motor housing includes a second scavenge sump;
said common drive shaft of said first and second constant displacement hydraulic motors drive a first and a second scavenge pumps;
said first scavenge pump interconnected with said first scavenge sump and said hydraulic fluid reservoir, said first scavenge pump returning hydraulic fluid from said first wheel motor housing to said hydraulic fluid reservoir; and,
said second scavenge pump interconnected with said second scavenge sump and said hydraulic fluid reservoir, said second scavenge pump returning hydraulic fluid from said second wheel motor housing to said hydraulic fluid reservoir.

2. An electric wheel motor cooling system as claimed in claim 1, wherein said first and second electric wheel motor housings form an electric drive axle.

3. An electric wheel motor cooling system as claimed in claim 1, further comprising:
a first gearbox associated with said first electric wheel motor and a second gearbox associated with said second electric wheel motor, said first gearbox includes a gear reducer and wet disc brakes, said gearbox includes a gear reducer and wet disc brakes.

4. An electric wheel motor cooling system as claimed in claim 1, further comprising:
said first scavenge pump and said second scavenge pump each have a first equal flow capacity;
said first constant displacement hydraulic motor and said second constant displacementhydraulic motor each have a second equal flow capacity; and,
said first equal flow capacity of said first scavenge pump and said second scavenge pump exceeds said second equal flow capacity of said first constant displacement hydraulic motor and said second constant displacement hydraulic motor.

5. An electric wheel motor cooling system as claimed in claim 1, further comprising:
said first constant displacement hydraulic motor and said second constant displacement hydraulic motor divides the flow of said hydraulic fluid equally between said first electric wheel motor and said second electric wheel motor.

6. An electric wheel motor cooling system, comprising:
a hydraulic fluid reservoir:
a first electric wheel motor and a second electric wheel motor;
a supply pump interconnected with said hydraulic fluid reservoir;
a first constant displacement hydraulic motor and a second constant displacement hydraulic motor, said first constant displacement hydraulic motor having a first displacement volume and said second constant displacement hydraulic motor having a second displacement volume;
a header interconnected with and downstream of said supply pump;
said header interconnected with said first constant displacement hydraulic motor and said second constant displacement hydraulic motor;
said supply pump supplies hydraulic fluid from said reservoir and to said header, said header supplies hydraulic fluid to said first constant displacement hydraulic motor and said second constant displacement hydraulic motor;
said first constant displacement hydraulic motor and said second constant displacement hydraulic motor linked and rotated together;
said first constant displacement hydraulic motor supplying hydraulic fluid to said first electric wheel motor; said second constant displacement hydraulic motor supplying hydraulic fluid to said second electric wheel motor; and, said first constant displacement hydraulic motor and said second constant displacement hydraulic motor dividing flow of hydraulic fluid according to said first displacement volume and said second displacement volume between said first electric wheel motor and said second electric wheel motor, respectively.

7. An electric wheel motor cooling system as claimed in claim 6, comprising:
a first electric wheel housing and a second electric wheel housing;
said first electric wheel motor housing includes a first scavenge sump and said second electric wheel motor housing includes a second scavenge sump.

8. An electric wheel motor cooling system as claimed in claim 7, comprising:
said first scavenge pump in fluidic communication with said first scavenge sump;
said second scavenge pump in fluidic communication with said second scavenge sump;
a scavenge header;
said first scavenge pump discharges into said scavenge header;
said second scavenge pump discharges into said scavenge header; and,
said scavenge header interconnected with said reservoir.

9. An electric wheel motor cooling system as claimed in claim 7, comprising:
said first constant displacement hydraulic motor and said second constant displacement hydraulic motor, in combination, driving said first scavenge pump and said second scavenge pump wherein said hydraulic fluid is removed from said scavenge sump and said second scavenge sump.

10. An electric wheel motor cooling system as claimed in claim 6, comprising:
a first electric wheel housing and a second electric wheel housing;
said first electric wheel motor housing includes a first scavenge sump;
said second electric wheel motor housing includes a second scavenge sump;
a first scavenge pump in fluidic communication with said first and second scavenge sumps; and, said first scavenge pump is interconnected with said hydraulic fluid reservoir for the return of said hydraulic fluid from said first and second scavenge sumps to said hydraulic fluid reservoir.

11. An electric wheel motor cooling system as claimed in claim 10, comprising:
said first constant displacement hydraulic motor and said second constant displacement hydraulic motor, in combination, drive said first scavenge pump.

12. An electric wheel motor cooling system as claimed in claim 8, further comprising:
said first constant displacement hydraulic motor and said second constant displacement hydraulic motor divide the flow of said hydraulic fluid equally between said first electric wheel motor and said second electric wheel motor.

13. An electric wheel motor cooling system as claimed in claim 9, further comprising:
said first constant displacement hydraulic motor and said second constant displacement hydraulic motor divide the flow of said hydraulic fluid equally between said first electric wheel motor and said second electric wheel motor.

14. An electric wheel motor cooling system as claimed in claim 10, further comprising:
said first constant displacement hydraulic motor and said constant displacement hydraulic motor divide the flow of said hydraulic fluid equally between said first electric wheel motor and second electric wheel motor.

15. An electric wheel motor cooling system as claimed in claim 1, further comprising:
- a cooling pump interconnected with said hydraulic reservoir;
- a heat exchanger; and,
- said cooling pump supplying hydraulic fluid to said heat exchanger for maintaining said hydraulic fluid in said reservoir at a constant temperature.

16. An electric wheel motor cooling system, comprising:
- a hydraulic fluid reservoir:
- a first electric wheel motor and a second electric wheel motor;
- a first electric wheel housing includes a first scavenge sump and a second electric wheel housing includes a second scavenge sump;
- a supply pump interconnected with said hydraulic fluid reservoir;
- a common shaft;
- a first constant displacement hydraulic motor and a second constant displacement hydraulic motor share said common shaft and rotate together;
- said first constant displacement hydraulic motor having a first displacement volume and said second constant displacement hydraulic motor having a second displacement volume;
- said supply pump supplies hydraulic fluid to said first constant displacement hydraulic motor and said second constant displacement hydraulic motor;
- said first constant displacement hydraulic motor supply hydraulic fluid to said first electric wheel motor thereby said hydraulic fluid drains to said first scavenge sump, said second constant displacement hydraulic motor supplying hydraulic fluid to said second electric wheel motor thereby said hydraulic fluid drains to said second scavenge sump, and, said first constant displacement hydraulic motor and said second constant displacement hydraulic motor divide flow of said hydraulic fluid from said supply pump according to said first displacement volume of said first constant displacement hydraulic motor and said second displacement volume of said second constant displacement hydraulic motor between said first electric wheel motor and said second electric wheel motor, respectively;
- a scavenge pump;
- said scavenge pump shares said common shaft with said first constant displacement motor and said second constant displacement motor and rotates therewith;
- said first constant displacement motor and said second constant displacement motor power said scavenge pump;
- said scavenge pump in fluidic communication with said first and second scavenge sumps; and,
- said scavenge pump is interconnected with said hydraulic fluid reservoir for the return of said hydraulic fluid from said first and second scavenge sumps to said reservoir.

17. An electric wheel motor cooling system as claimed in claim 16 wherein said hydraulic fluid is divided equally between said first electric wheel motor and said second electric wheel motor.

18. An electric wheel motor cooling system as claimed in claim 16 wherein said hydraulic fluid is divided unequally between said first electric wheel motor and said second electric wheel motor.

* * * * *

UNITED STATES PATENT AND TRADEMARK OFFICE
CERTIFICATE OF CORRECTION

PATENT NO. : 9,853,523 B2
APPLICATION NO. : 14/839951
DATED : December 26, 2017
INVENTOR(S) : Caron et al.

Page 1 of 1

It is certified that error appears in the above-identified patent and that said Letters Patent is hereby corrected as shown below:

In the Claims

Claim 4, Column 9, Line 19, after "constant" delete "displacementhydraulic" and insert --displacement hydraulic-- therefor.

Claim 16, Column 11, Line 29, after "motor" delete "supply" and insert --supplying-- therefor.

Signed and Sealed this
Nineteenth Day of June, 2018

Andrei Iancu
*Director of the United States Patent and Trademark Office*